Nov. 2, 1954
H. BROCKMANN ET AL
PICROMYCIN, ITS SALTS AND THE
PROCESS OF PRODUCING SAME
Filed Dec. 27, 1950
2,693,433
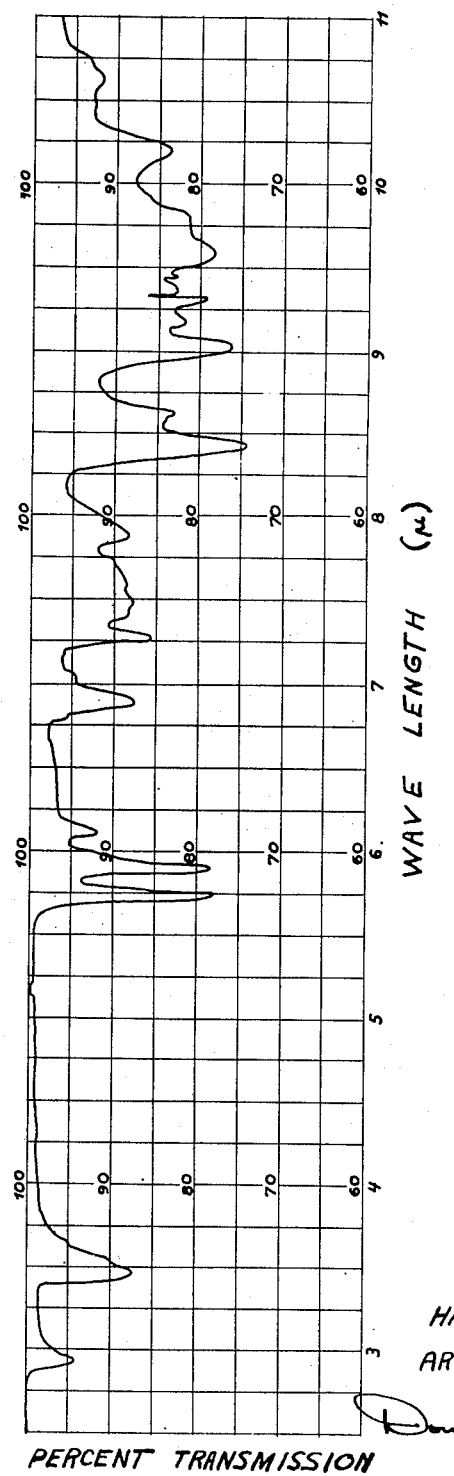
INVENTOR.
HANS BROCKMANN
AND
ARNOLD BOHNE
ATTORNEY

United States Patent Office 2,693,433
Patented Nov. 2, 1954

2,693,433

PICROMYCIN, ITS SALTS AND THE PROCESS OF PRODUCING SAME

Hans Brockmann, Gottingen, and Arnold Bohne, Wuppertal-Barmen, Germany, assignors to Schenley Industries, Inc., New York, N. Y., a corporation of Delaware Application December 27, 1950, Serial No. 203,040

Claims priority, application Switzerland December 28, 1949

2 Claims. (Cl. 167—65)

This invention relates, generally, to antibiotic substances and, more particularly, to a new and useful antibiotic substance, picromycin, and to the process for preparing the same by cultivation, under particular controlled conditions, of strains, as yet unidentified, of the microorganism Actinomyces.

One of these strains of Actinomyces, isolated from a barren soil sample, has been designated Actinomyces "Bo. 105," which has been found to be a novel species of the micro-organism, named *Streptomyces felleus*. This new species grows under aerobic conditions at an optimum temperature of 27° C., forming a vegetative mycelium without special characteristics and an aerial mycelium, consisting of unbranched, thick hyphae, which segregate into oval spores. When gelatine is used as a culture medium, it is liquefied and the growth of the microorganism is poor, finely distributed and colorless on the surface of the medium. When cultivated upon this medium, the growth is so poor that it does not form an aerial mycelium. It grows abundantly on agar cultures obtained with synthetic nutrient solutions, forming a crimped, soft, brown-yellow mycelium, but only a limited, gray-white, aerial mycelium. The agar itself is colored weakly brown. In starch-agar, an abundant, flat, continuous growth is observed and here, too, the mycelium is weakly brown. The formation of the aerial mycelium when using this medium is limited and the mycelium has a brownish-white coloration. The starch-agar itself is colored slightly brown. When Lugol's solution is poured over the culture, a large, colorless, zone is obtained and the starch is hydrolyzed. The new species grows abundantly on glucose agar, forming a brownish, soft, crimped mycelium. No aerial mycelium is formed on this nutrient medium. The agar itself is pigmented in a brownish color. On litmus milk, the micro-organism grows abundantly at the edges, the mycelium being of brownish color, and the medium is rendered distinctly blue by the alkaline reaction. Casein is not precipitated but the milk becomes quite clear, which shows that the casein is hydrolized. On potatoes, a good but very fine growth is observed; the mycelium is soft, weakly crimped, and colorless to weakly brown, and an aerial mycelium is not observed. Growth is limited on cellulose agar: large, very thin, colonies are formed, but no aerial hyphae, and the cellulose is decomposed. No visible growth is observed on cellulose broths. The nutrient culture broth does not reduce nitrates and no formation of hydrogen sulfide is observed, during cultivation of the micro-organism. A potent viable sample culture of this new strain of Actinomyces has been deposited in the permanent collection of the U. S. Department of Agriculture Fermentation Division, Northern Regional Research Laboratory, Peoria 5, Illinois, where it has been designated as strain N. R. R. L. No. 2251.

It is now found, pursuant to this invention, that a new, highly active antibiotic designated picromycin, is obtained by cultivating on suitable nutrient solutions, strains of Actinomycetes. The antibiotic has a very strong inhibitory effect against *Staphylococcus aureus* and *Bacillus subtilis*, being still active in a dilution of 1 : 1,000,000.

The strain of "Actinomyces Bo 105" has been found to be particularly suitable for production of the new active product and a culture filtrate of this microorganism inhibits *Staphylococcus aureus* and *Bacillus subtilis* with practically no discoloration. Isolation of the new antibiotic from the culture filtrate is accomplished by evaporating the liquor at a low temperature, adjusting to an alkaline pH and extracting the basic antibiotic with ether. The etherial solution of the antibiotic is shaken with an aqueous acid solution to form a water-soluble salt and, after repeating this procedure several times, the antibiotic is precipitated from the ethereal solution, preferably in form of a salt, from which the free picromycin may be obtained by usual methods. This product may be recrystallized, if desired, from methanol.

Picromycin is an antibiotic agent, elaborated during cultivation of microorganisms of the group Actinomyces, having the following characteristic properties:

Elemental analysis:
Carbon _____ 63.86
Hydrogen _____ 9.02
Nitrogen _____ 2.92
Oxygen _____ 24.26

Probable empirical formula:

$$C_{25}H_{43}O_7N$$

Melting point, in air, 169° to 170° C.
Methoxy groups present, none.
Molecular weight 458 to 470.
Dissolves in concentrated sulfuric acid to produce an orange-red coloration that fades upon dilution with formation of a flocculent precipitate $[\alpha]_D^{24}$ in chloroform (c.=6.3%) _____ —50.2°
$[\alpha]_D^{23}$ in alcohol (c.=3.5%) _____ +8.2°

As shown in the accompanying drawings it exhibits characteristic absorption bands in the infrared region of the spectrum, when dissolved in carbon tetrachloride, at the following wavelengths, expressed in $\mu$, 2.93, 3.47, 3.54, 3.65, 5.74, 5.91, 6.12, 6.89, 7.28, 7.48, 7.61, 7.87, 8.41, 8.62, 9.07, 9.19, 9.31, 9.34, 9.44, 9.57 and 9.78. The significance of certain of these absorption bands, referring to them by wavelength in $\mu$, is as follows:

2.93: Must be interpreted as indicating the presence of a hydroxyl group.
3.47: With great probability, this band is caused by a $CH_2$ or $CH_3$ group.
3.54: This band should possibly be attributed to the $CH_3$ of the dimethyl amino group.
3.65: This band is probably caused by a methyl group.
5.74: This band, almost certainly, is attributable to a CO group, whether an ester, aldehyde, keto
5.91: or conjugated lactone-carbonyl group. The same is true as regards the band 5.91.
6.12: Can be attributed either to the CO-band of an N-dimethylamide or to the band of a C=C group.
6.89: With great probability, this band indicates the presence of a CH band. The same holds true
7.28: for the band 7.28.

The bands of longer wavelengths do not permit of an even moderately safe interpretation. Bacteriological spectrum of picromycin values obtained after 20 hours in Hiss's nutrient solution.

| Strains tested | Inhibition (γ/ccm.) |
|---|---|
| Streptococci | 0.05. |
| Enterococci | 5.0–10.0. |
| Staphylococci | 1.0–2.5. |
| B. coli | more than 100. |
| B. subtilis | 1.0–5.0. |

Very soluble in dilute acids because of its basic properties; easily soluble in acetone, benzene, chloroform, ethyl acetate; moderately soluble in ether, cold methanol; difficultly soluble in carbon disulfide, petroleum ether, water, and aqueous caustic solutions.

Characteristic infra-red absorption spectra of picromycin free base: using a 45 milligram sample of the free base, dissolved in 14.362 g. of carbon tetrachloride (0.314 percent picromycin by weight) and a cell depth of 0.4 mm., various absorption bands as indicated in the accompanying drawing, are observed, particularly in the region of 950 cm.$^{-1}$ to 1750 cm.$^{-1}$, making clear that picromycin is different from any previously described antibiotic material.

Toxicity: The minimum lethal dose by intravenous injection in mice is between 0.1 g. and 0.7 g. per kilogram.

Picromycin, because of its basic characteristics, is readily soluble in dilute acids and it cannot be extracted from such solutions by organic solvents. The hydrochloride salt of picromycin can be obtained, as an amorphous, hygroscopic solid, by treating an ethereal solution of the base with gaseous hydrogen chloride. The picrate may be prepared by treating an aqueous solution of picromycin hydrochloride with picric acid, from which the salt separates as a yellow precipitate. Picromycin is bitter to the taste and, when heated with zinc dust, yields a volatile alkaline distillate having the characteristic odor of amines. Picromycin does not have any characteristic absorption bands, either in the ultraviolet or visible portions of the spectrum. It does not react with p-nitrophenyl-hydrazine, either upon prolonged heating or upon standing at about room temperature for several days. When boiled with hydrochloric acid, no degradation products are obtained that produce a positive Abderhalden reaction with ninhydrin. Upon heating an aqueous solution of picromycin hydrochloride, at pH 8, for twelve to fourteen hours at 60° C., an insoluble crystalline degradation product is formed as a precipitate, which is tasteless, completely inactive against *S. aureus*, melts at 173° C., and which contains no nitrogen. This product has the probable empirical formula $C_{20}H_{30}O_5$, based on elemental analysis and molecular weight determinations, and it is soluble in dilute acids or dilute alkaline solutions. It dissolves in concentrated sulfuric acid, producing an orange-yellow coloration. Its crystal form is similar to that of picromycin and it forms a reaction product with p-nitrophenyl-hydrazine.

Instead of the above-described process for obtaining picromycin from the Actinomyces culture filtrate, the picromycin may also be recovered by chromatographic adsorption and fractional distribution processes in known manner. The picromycin may also be concentrated by use of ion exchangers.

The following example illustrates a practical application of the principles of this invention in a process for manufacturing picromycin.

EXAMPLE

*Preliminary culture*

For the preliminary culture, 300 cc. Erlenmeyer flasks are charged with 50 cc. each of nutrient solution, which has been sterilized and inoculated with Actinomyces of the strain Bo 105, and the flasks are shaken at 30° in a shaking apparatus for about 5 days, during which time the mycelium propagates. This solution inhibits the growth of *Staphylococcus aureus* in a dilution of 1 : 50 to 1 : 100. The nutrient solution used preferably is of the following approximate composition:

| | Parts by weight |
|---|---|
| Tap water | 500 |
| Glycerol | 10 |
| Glycocoll | 0.75 |
| Corn steep liquor | 1. |
| Potassium phosphate (secondary) | 0.75 |
| Sodium chloride | 0.5 |
| Magnesium sulfate | .025 |
| Ferrous sulfate | .005 |
| Calcium carbonate precipitated | .005 |

*Chief culture*

A suitable volume of the nutrient solution is sterilized at 120° for one hour in a vessel provided with a stirrer and a sparger, then the vessel and contents are cooled to 30° and the nutrient solution is inoculated, under sterile conditions, with the above described preliminary culture to obtain the chief culture. This culture is incubated with stirring at 29° to 30° for 6 to 8 days, and air is bubbled through the medium during the incubation period. The volume of air to be passed through the medium during incubation period depends on the volume of the medium, but, for example a volume of about 500 liters per minute at the beginning of operations is satisfactory for about 550 kilograms of medium. Excessive foaming may be prevented by reducing the rate of flow of the air or by adding an antifoam-agent to the medium. The pH of the nutrient solution is 6.8 to 7.2 at the beginning and increases to 7.4 to 8.1 during incubation. The coloration of the nutrient solution, which is weakly brownish before incubation, does not change substantially during the growth of the incubated microorganisms, but the culture liquor becomes turbid due to the growing microorganisms. The culture filtrate inhibits *Staphylococcus aureus* and *Bacillus subtilis* in a dilution of 1 : 100 to 1 : 200.

*Recovery of picromycin from the culture filtrate*

When the growth of the mycelium is complete, the culture liquor is removed from the vessel and it is separated from the precipitated mycelium, preferably by means of centrifuging. The mycelium obtained from a 550 kilogram batch weighs about 10 kilograms in the wet state and about 2 kilograms when dried in the air.

Isolation of the picromycin from the clarified culture filtrate may be accomplished according to the following methods:

(a) The culture filtrate is concentrated, initially under reduced pressure and at a low temperature, to about one twentieth of its initial volume, then it is adjusted to a pH of about 8.0 by adding dilute caustic soda solution and it is shaken out with ether, the antibiotic passing into the ether. The ether layer is separated and shaken out with n/100 hydrochloric acid, the antibiotic dissolving in the acid-containing water, and this separated acid solution is adjusted to a pH of 8.0 and shaken out again with ether. After repeating this procedure several times, the ether is evaporated and the dry residue is taken up with absolute ether. Gaseous hydrogen chloride is passed into this etherical solution, causing the hydrochloride of the antibiotic to precipitate, then the mixture is filtered and washed with absolute ether. The picromycin hydrochloride thus obtained is dissolved in water, the solution obtained is rendered alkaline with 2N-sodium carbonate solution and it is then extracted with ether. By evaporating the ether, the picromycin precipitates in colorless crystals.

(b) The picromycin may also be recovered by extracting the centrifuged culture filtrate with ethyl acetate or amyl acetate, then purifying the residues obtained on evaporation of these solutions as above described.

(c) A further possibility of isolating the picromycin may be realized by concentrating the culture filtrate to a small volume and treating it with concentrated alcohol. A solution is thus obtained which can be easily separated from inactive by-products by filtering. The alcoholic filtrate is concentrated to a small volume and yields a clear sirup which may be treated with ether as above described after being rendered alkaline, to yield the desired product.

By the term "strain of picromycin-producing Actinomyces" as used in the following claims is meant a strain of Actinomyces, species *Streptomyces felleus*.

Having thus described the subject matter of the present invention, what it is desired to secure by Letters Patent is:

1. A substance chosen from the group consisting of picromycin and acid salts of picromycin, said picromycin being a novel basic antibiotic agent, elaborated during aerobic cultivation, in a nutrient medium, of the strain of Actinomyces designated N. R. R. L. No. 2251, having activity against strains of Streptococci, Enterococci, Staphylococci, *B. coli, B. subtilis;* being a basic organic substance having the following characteristic properties:

| Elemental analysis: | Percent |
|---|---|
| Carbon | 63.86 |
| Hydrogen | 9.02 |
| Nitrogen | 2.92 |
| Oxygen | 24.26 |

Probable empirical formula:

$$C_{25}H_{43}O_7N$$

Melting point, in air, 169° to 170° C.;
Methoxy groups present, none;
Molecular weight, 458 to 470;

Dissolves in concentrated sulfuric acid to produce an orange-red coloration that fades upon dilution, with formation of a flocculent precipitate;
$[\alpha]_D^{24}$ in chloroform (c.=6.3%), $-50.2°$;
$[\alpha]_D^{23}$ in alcohol (c.=3.5%), $+8.2°$;
Very soluble in dilute acids because of its basic properties; easily soluble in acetone, benzene, chloroform, ethyl acetate; moderately soluble in ether, cold methanol; difficultly soluble in carbon disulfide, petroleum ether, water, and aqueous caustic solutions; and exhibiting characteristic absorption bands in the infrared region of the spectrum, when dissolved in carbon tetrachloride, at the following wave lengths, expressed in $\mu$: 2.93, 3.47, 3.54, 3.65, 5.74, 5.91, 6.12, 6.89, 7.28, 7.48, 7.61, 7.87, 8.41, 8.62, 9.07, 9.19, 9.31, 9.34, 9.44, 9.57, and 9.78.

2. Process for the production of picromycin which comprises inoculating a suitable organic nutrient medium with a strain of picromycin-producing Actinomyces designated N. R. R. L. No. 2251; propagating the microorganisms in the medium under aerobic conditions at a temperature of about 30° C. and an initial hydrogen ion concentration within the range of about pH 6.8 to pH 7.2 until the hydrogen ion concentration increases to within the range of about pH 7.4 to pH 8.1; separating the fermented culture broth from the mycelium; adjusting the hydrogen ion concentration of the separated broth to about pH 8.0, extracting the broth with ether; concentrating the organic extract, extracting it with an acid, and recovering, by making the aqueous extract alkaline, picromycin, an antibiotic agent of the probable empirical formula $C_{25}H_{43}O_7N$, having a molecular weight of about 470 and the following physical properties: melting point: about 169° to 170°, $[\alpha]_D^{24}$ in chloroform $-50°$, $[\alpha]_D^{23}$ in alcohol $+8°$, content of nitrogen about 3%, free of methoxyl, and having characteristic absorption bands in the infrared region of the spectrum, when dissolved in carbon tetrachloride, at the following wavelengths, expressed in $\mu$, 2.93, 3.47, 3.54, 3.65, 5.74, 5.91, 6.12, 6.89, 7.28, 7.48, 7.61, 7.87, 8.41, 8.62, 9.07, 9.19, 9.31, 9.34, 9.44, 9.57, and 9.78.

References Cited in the file of this patent
UNITED STATES PATENTS

| Number | Name | Date |
|---|---|---|
| 2,482,055 | Duggar | Sept. 13, 1949 |

OTHER REFERENCES

Florey et al., Antibiotics 1949, Oxford Univ. Press, N. Y., pages 381 thru 384.

Waksman, The Actinomycetes, 1950, published by the Chronica Botanica Co., Waltham, Mass., pp. 94 to 98, 116 QK-604-W3.

Welsch, Jour. Bact. (1942), vol. 44, pp. 571-583.